United States Patent
Ikeda

(10) Patent No.: US 10,072,169 B2
(45) Date of Patent: Sep. 11, 2018

(54) INKJET INK AND IMAGE-FORMING METHOD

(71) Applicant: Konica Minolta, Inc., Chiyoda-ku, Tokyo (JP)

(72) Inventor: Masashi Ikeda, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/549,865

(22) PCT Filed: Feb. 2, 2016

(86) PCT No.: PCT/JP2016/053030
§ 371 (c)(1),
(2) Date: Aug. 9, 2017

(87) PCT Pub. No.: WO2016/129452
PCT Pub. Date: Aug. 18, 2016

(65) Prior Publication Data
US 2018/0022949 A1  Jan. 25, 2018

(30) Foreign Application Priority Data

Feb. 9, 2015 (JP) ................................ 2015-023043

(51) Int. Cl.
  *B41J 11/00* (2006.01)
  *C09D 11/101* (2014.01)
  *C09D 11/322* (2014.01)
  *C09D 11/38* (2014.01)
  *C09D 11/30* (2014.01)
  *C09D 11/54* (2014.01)

(52) U.S. Cl.
  CPC ............ *C09D 11/38* (2013.01); *B41J 11/002* (2013.01); *C09D 11/101* (2013.01); *C09D 11/30* (2013.01); *C09D 11/322* (2013.01); *C09D 11/54* (2013.01)

(58) Field of Classification Search
  CPC ..... B41J 2/01; B41J 11/002; B32B 2038/076; B32B 7/0045; B32B 7/0081; C09D 7/009; C09D 11/02; C09D 11/12; C09D 11/30; C09D 11/34; C09D 11/38; C09D 11/101; C09D 11/107; C09D 11/322
  See application file for complete search history.

(56) References Cited

U.S. PATENT DOCUMENTS

| | | | | |
|---|---|---|---|---|
| 7,638,163 B2* | 12/2009 | Murakami | ........... | G02B 5/0215 427/164 |
| 8,398,228 B2* | 3/2013 | Nakamura | ............. | B41J 11/002 347/102 |
| 8,733,922 B2* | 5/2014 | Kaga | ................... | C09D 11/101 347/102 |
| 9,016,846 B2* | 4/2015 | Ikeda | ................... | C09D 11/101 347/100 |
| 2008/0081119 A1* | 4/2008 | Oyanagi | .............. | C09D 11/101 427/385.5 |

FOREIGN PATENT DOCUMENTS

| | | |
|---|---|---|
| JP | 2006193745 A | 7/2006 |
| JP | 2010017710 A | 1/2010 |
| JP | 2012040760 A | 3/2012 |
| JP | 2013226745 A | 11/2013 |
| JP | 2014118570 A | 6/2014 |

OTHER PUBLICATIONS

IPRP of the International Search Authority, English Translation of the Written Opinion corresponding to PCT/JP2016/053030; dated Aug. 24, 2017.
Extended European Search Report corresponding to Application No. 16749096.0-1102/3257907 PCT/JP2016053030; dated Jan. 9, 2018.
International Search Report for corresponding Application No. PCT/JP2016/053030; dated May 10, 2016.

* cited by examiner

*Primary Examiner* — Ahn T. N. Vo
(74) *Attorney, Agent, or Firm* — Cantor Colburn LLP

(57) ABSTRACT

The purpose of the present invention is to provide an active ray-curable inkjet ink capable of further enhancing gloss uniformity, surface curability, and scratch resistance of a formed image. The purpose is achieved by an active ray-curable inkjet ink containing a polymerization initiator, a photopolymerizable compound, and a gelling agent, and that undergoes a reversible sol-gel phase transition by temperature change. The inkjet ink contains a polymerization initiator with a molecular weight of 360 or more, and a polyfunctional photopolymerizable compound. The inkjet ink contains 3.0 mass % or more and less than 8.0 mass % of the polymerization initiator with a molecular weight of 360 or more, 1.0 mass % or more and less than 5.0 mass % of the gelling agent, less than 0.1 mass % of the initiator with a molecular weight of 360 or more, and less than 5.0 mass % of the monofunctional photopolymerizable compound.

7 Claims, No Drawings

INKJET INK AND IMAGE-FORMING METHOD

This is the U.S. national stage of application No. PCT/JP2016/053030, filed Feb. 2, 2016. Priority under 35 U.S.C. § 119(a) and 35 U.S.C. § 365(b) is claimed from Japanese Application No. 2015-023043, filed Feb. 9, 2015, the disclosures of which are also incorporated herein by reference.

TECHNICAL FIELD

The present invention relates to an inkjet ink and an image forming method.

BACKGROUND ART

Inkjet recording methods can easily form images at low costs, and thus are employed in various printing fields. As an inkjet ink, known is an ink containing photocurable compounds, which cure through polymerization and crosslinking upon irradiation with actinic radiation (hereinafter also simply referred to as "actinic radiation-curable ink"). Such actinic radiation-curable inks have drawn attention in recent years since images with high adhesion can be formed even on recording media showing low water absorption.

Examples of the photocurable compounds include radically polymerizable compounds which cure through polymerization using radicals as reaction centers, and cationic polymerizable compounds which cure through polymerization using cations as reaction centers. When actinic radiation-curable inks contain photocurable compounds, polymerization initiators are known to be contained in inks so as to initiate polymerization more efficiently. As examples of the polymerization initiators, known are radical polymerization initiators that can generate radicals upon irradiation with actinic radiation, and cationic polymerization initiators that can generate cations upon irradiation with actinic radiation.

Also known is a technique in which gelling agents are contained in actinic radiation-curable inks such that the inks undergo sol-gel phase transition reversibly through a temperature change. Such inks, when the temperature of the inks lowers upon impact on recording media, undergo gelation due to crystallization of the gelling agents. Accordingly, pinning properties of the inks upon impact on recording media are enhanced and thus coalescence of adjacent dots is less likely to occur, and consequently higher-definition images can be formed (see, Patent Literature (hereinafter, abbreviated as PTL) 1 and PTL 2, for example).

CITATION LIST

Patent Literature

PTL 1
Japanese Patent Application Laid-Open No. 2006-193745
PTL 2
Japanese Patent Application Laid-Open No. 2010-017710

SUMMARY OF INVENTION

Technical Problem

Various characteristics are sometimes required for actinic radiation-curable inks depending on printing fields in which inkjet recording methods are employed. For example, in order to form images with desirable quality in various fields, there always exists a need for actinic radiation-curable inks that can further enhance gloss uniformity, surface curability, and scratch resistance of formed images.

The present invention has been achieved in light of the foregoing circumstances, and an object of the present invention is to provide an actinic radiation-curable inkjet ink that can further enhance gloss uniformity, surface curability, and scratch resistance of formed images, as well as an image forming method using the actinic radiation-curable inkjet ink.

Solution to Problem

A first aspect of the present invention relates to the following inkjet ink.

[1] An actinic radiation-curable inkjet ink which reversibly undergoes sol-gel phase transition through a temperature change, and which contains one or more polymerization initiators, one or more photocurable compounds, and a gelling agent, in which: the polymerization initiators include one or more polymerization initiators with a molecular weight of 360 or more; the photocurable compounds include a polyfunctional photocurable compound; a content of the at least one polymerization initiator with a molecular weight of 360 or more is 3.0 mass % or more and less than 8.0 mass %; a content of the gelling agent is 1.0 mass % or more and less than 5.0 mass %; a content of a polymerization initiator with a molecular weight of less than 360 is less than 0.1 mass %; and a content of a monofunctional photocurable compound is less than 5.0 mass %.

[2] The inkjet ink according to [1], in which the polymerization initiators with a molecular weight of 360 or more include a radical polymerization initiator having a bisacylphosphine structure.

[3] The inkjet ink according to [2], in which the polymerization initiators with a molecular weight of 360 or more further include a polymerization initiator having a thioxanthone structure.

[4] The inkjet ink according to any one of [1] to [3], in which the gelling agent is substantially free of a photocurable functional group.

[5] The inkjet ink according to any one of [1] to [4], in which the gelling agent includes a compound represented by general formula G1: R1-CO—R2 where R1 and R2 are each independently a $C_9$-$C_{25}$ linear or branched hydrocarbon group, or a compound represented by general formula G2: R3-COO—R4 where R3 and R4 are each independently a $C_9$-$C_{25}$ linear or branched hydrocarbon group.

A second aspect of the present invention relates to the following image forming method.

[6] An image forming method including ejecting the inkjet ink according to any one of [1] to [5] from a nozzle of an inkjet head to allow the inkjet ink to impact on a recording medium, and curing the inkjet ink by irradiating the impacted inkjet ink with actinic radiation.

[7] The image forming method according to [6], further including, before or simultaneously with the allowing of the inkjet ink to impact, controlling a surface temperature at 20° C. or higher and 40° C. or lower of the recording medium on a side where the inkjet ink impacts.

Advantageous Effects of Invention

The present invention provides an actinic radiation-curable inkjet ink that can further enhance gloss uniformity, surface curability, and scratch resistance of formed images, as well as an image forming method using the actinic radiation-curable inkjet ink.

DESCRIPTION OF EMBODIMENTS

1. Inkjet Ink

An inkjet ink according to the present invention is an actinic radiation-curable inkjet ink that contains one or more polymerization initiators, one or more photocurable compounds, and a gelling agent, and reversibly undergoes sol-gel phase transition through a temperature change.

The inkjet ink according to the present invention can further enhance gloss uniformity, surface curability, and scratch resistance of formed images. This is presumably due to the following reasons.

When an actinic radiation-curable inkjet ink, which contains a polymerization initiator, a photocurable compound, and a gelling agent, is cured by irradiating with actinic radiation, polymerization starts from the polymerization initiator while part of the polymerization initiator is left unreacted. Components including such an unreacted photoinitiator, the gelling agent, and an uncured photocurable compound are sometimes deposited on an image surface, resulting in lowering in gloss of the image and lowering in surface curability of the ink.

In contrast, with respect to the inkjet ink of the present invention, an unreacted polymerization initiator is less likely to migrate through the ink since the polymerization initiator has a relatively high molecular weight. Moreover, the inkjet ink of the present invention further restricts the migration of ink components through a cured ink film since a high content of a di- or higher-functionality photocurable compound results in high crosslinking density during curing of a photocurable composition. Such effects presumably reduce deposition of the above-mentioned components on image surfaces, and thus further enhance gloss uniformity and surface curability of formed images.

Further, the inkjet ink of the present invention presumably enhances crosslinking density and thus scratch resistance of formed images since the content of a monofunctional photocurable compound is less than 5.0 mass %. Also, the inkjet ink of the present invention presumably enhances the strength of a cured film and thus scratch resistance of formed images since the content of the gelling agent is less than 5.0 mass %.

1-1. Polymerization Initiators

A polymerization initiator (hereinafter also simply referred to as "an initiator") can initiate polymerization and crosslinking of below-mentioned photocurable compounds upon irradiation with actinic radiation. Only one or two or more initiators may be contained in an inkjet ink.

One or more initiators include an initiator with a molecular weight of 360 or more. The initiator with a molecular weight of 360 or more is less likely to suffer deposition on image surfaces since the migration of the initiator through a cured ink film is less likely and restricted further by a mesh structure resulted from polymerization and crosslinking of below-mentioned photocurable compounds. As a result, an image of a cured inkjet ink presumably exhibits suppressed lowering in gloss of image surfaces and lowering in surface curability.

The content of the initiator is 3.0 mass % or more and less than 8.0 mass % based on the total mass of an inkjet ink. By setting the content of the initiators to 3.0 mass % or more and less than 8.0 mass %, an ink can be cured satisfactorily by fully polymerizing and crosslinking a photocurable compound.

The initiators may optionally include an initiator with a molecular weight of less than 360 as long as the advantageous effects of the present invention are exerted. From a viewpoint of suppressing lowering in gloss of image surfaces and lowering in surface curability due to deposition of a decomposed initiator, however, the content of the initiator with a molecular weight of less than 360 is preferably less than 0.1 mass % based on the total mass of an inkjet ink.

Examples of the initiators include radical polymerization initiators and cationic polymerization initiators.

Examples of the radical polymerization initiators include an initiator having a bisacylphosphine structure, an initiator having an alkylphenone structure, an initiator having a thioxanthone structure, an initiator having an acylphosphine structure, and an initiator having a benzophenone structure. Among them, an initiator having a bisacylphosphine structure, an initiator having an alkylphenone structure, and an initiator having a thioxanthone structure are preferable from a viewpoint of further enhancing the advantageous effects of the present invention.

According to the findings made by the present inventors, initiators including a radical polymerization initiator having a bisacylphosphine structure further suppress lowering in gloss of image surfaces and lowering in surface curability. This is presumably because the radical polymerization initiator having a bisacylphosphine structure is highly reactive and facilitates the progress of polymerization and crosslinking centered on the radical polymerization initiator, and thus further restricts the migration of the decomposed initiator. In view of this, the content of the radical polymerization initiator having a bisacylphosphine structure is preferably 2 mass % or more and 8 mass % or less, more preferably 3 mass % or more and 5 mass % or less, based on the total mass of an ink.

Also, according to the findings made by the present inventors, initiators further including a radical polymerization initiator having a thioxanthone structure, in addition to the radical polymerization initiator having a bisacylphosphine structure, further suppress lowering in gloss of image surfaces and lowering in surface curability. From a viewpoint of satisfactorily exerting the advantageous effects, the content of the radical polymerization initiator having a thioxanthone structure is preferably 0.5 mass % or more and 5 mass % or less based on the total mass of an ink, more preferably 0.5 mass % or more and 3 mass % or less, further preferably 1 mass % or more and 3 mass % or less, further more preferably 2 mass % or more and 3 mass % or less.

Examples of the radical polymerization initiators with a molecular weight of 360 or more having a bisacylphosphine structure include bis(2,4,6-trimethylbenzoyl)phenylphosphine oxide, bis(2,6-dimethylbenzoyl)phenylphosphine oxide, bis(2,4,6-trimethylbenzoyl)(2-methoxyphenyl)phosphine oxide, bis(2,6-dimethylbenzoyl)(2-methoxyphenyl) phosphine oxide, bis(2,4,6-trimethylbenzoyl)(2,4-dimethoxyphenyl)phosphine oxide, bis(2,6-dimethylbenzoyl)(2, 4-dimethoxyphenyl)phosphine oxide, bis(2,4,6-trimethylbenzoyl)(2,4-dipentyloxyphenyl)phosphine oxide, and bis(2,6-dimethylbenzoyl)(2,4-dipentyloxyphenyl)phosphine oxide.

Examples of commercially available products of the radical polymerization initiators with a molecular weight of 360 or more having a bisacylphosphine structure include IRGACURE 819 (from BASF SE, "IRGACURE" is a registered trademark of the firm).

Examples of commercially available products of the radical polymerization initiators with a molecular weight of 360 or more having an alkylphenone structure include IRGACURE 369, IRGACURE 379 (from BASF SE), ESACURE 1001M, and ESACURE KIP 150 (from Lamberti S.p.A., "ESACURE" is a registered trademark of the firm).

Examples of commercially available products of the radical polymerization initiators with a molecular weight of 360 or more having a thioxanthone structure include GENOPOL TX-1 (from Rahn AG) and Speedcure 7010 (from Lambson Limited).

Examples of the radical polymerization initiators with a molecular weight of 360 or more having an acylphosphine structure include 2,4,6-trimethylbenzoylethoxyphenylphosphine oxide, 2,6-dimethylbenzoylethoxyphenylphosphine oxide, 2,4,6-trimethylbenzoylmethoxyphenylphosphine oxide, 2,6-dimethylbenzoylmethoxyphenylphosphine oxide, 2,4,6-trimethylbenzoyl(4-pentyloxyphenyl)phenylphosphine oxide, and 2,6-dimethylbenzoyl(4-pentyloxyphenyl)phenylphosphine oxide.

Examples of commercially available products of the radical polymerization initiators with a molecular weight of 360 or more having a benzophenone structure include Speedcure 7005 (from Lambson Limited) and Omnipol BP (from Rahn AG).

Examples of commercially available products of the radical polymerization initiators with a molecular weight of less than 360 having a bisacylphosphine structure include Lucirin TPO (from BASF SE, "Lucirin" is a registered trademark of the firm).

Examples of commercially available products of the radical polymerization initiators with a molecular weight of less than 360 having an alkylphenone structure include IRGACURE 184 and IRGACURE 907 (from BASF SE).

Examples of commercially available products of the radical polymerization initiators with a molecular weight of less than 360 having an thioxanthone structure include Speedcure ITX (from BASF SE).

Examples of the cationic polymerization initiators include an aromatic onium compound salt, a sulfonate which generates a sulfonic acid, a halide which generates a hydrogen halide, and an iron allene complex.

Examples of the onium compounds include diazonium, ammonium, iodonium, sulfonium, and phosphonium compounds. Examples of counter ions that form salts with the aromatic onium compounds include $B(C_6F_5)^{4-}$, $PF^{6-}$, $AsF^{6-}$, $SbF^{6-}$, and $CF_3SO^{3-}$.

Examples of the aromatic onium compounds include compounds described in paragraph 0134 of Japanese Patent Application Laid-Open No. 2005-255821. Examples of the sulfonates which generate a sulfonic acid include compounds described in paragraph 0136 of Japanese Patent Application Laid-Open No. 2005-255821, compounds recited in claim 1 of Japanese Patent Application Laid-Open No. 2004-91698, and compounds recited in claim 1 of Japanese Unexamined Patent Application Publication (Translation of PCT Application) No. 2006-518332. Examples of the halides which generate a hydrogen halide include compounds described in paragraph 0138 of Japanese Patent Application Laid-Open No. 2005-255821. Examples of the iron allene complexes include compounds described in paragraph 0140 of Japanese Patent Application Laid-Open No. 2005-255821.

Examples of commercially available products of the cationic polymerization initiators with a molecular weight of 360 or more include CPI-100P (from San-Apro Ltd.) and IRGACURE 250 (from BASF SE).

Examples of the cationic polymerization initiators with a molecular weight of less than 360 include triphenylsulfonium bromide.

1-2. Photocurable Compounds

Examples of the photocurable compounds include a radically polymerizable compound and a cationic polymerizable compound. Photocurable compounds function to cure inkjet inks through crosslinking or polymerization upon irradiation with actinic radiation. Such photocurable compounds may be any of monomers, polymerizable oligomers, prepolymers, and mixtures thereof. Only one or two or more photocurable compounds may be contained in an inkjet ink.

Examples of actinic radiation include ultraviolet rays, electron beams, α rays, γ rays, and X rays. Actinic radiation is preferably ultraviolet rays or electron beams from a viewpoint of safety as well as a viewpoint of triggering polymerization and crosslinking even at lower energy dose.

The photocurable compounds include a polyfunctional photocurable compound having two or more functional groups polymerizable upon irradiation with actinic radiation. Such a polyfunctional photocurable compound tends to form a mesh-like polymer with high crosslinking density through polymerization and crosslinking upon irradiation with actinic radiation. Such a mesh-like polymer presumably reduces deposition of an initiator, a gelling agent, and an uncured photocurable compound on an image surface by restricting the migration of each component during curing of an inkjet ink. Therefore, a polyfunctional photocurable compound is believed to be able to suppress lowering in gloss of image surfaces and lowering in surface curability.

The photocurable compounds may optionally include a monofunctional photocurable compound as long as the advantageous effects of the present invention are exerted. The content of the monofunctional photocurable compound is, however, preferably less than 5.0 mass %, more preferably less than 1.0 mass %, further preferably less than 0.1 mass %, based on the total mass of an inkjet ink, from a viewpoint of further enhancing crosslinking density and thus reducing deposition of an initiator, a gelling agent, and an uncured photocurable compound on an image surface, as well as a viewpoint of enhancing crosslinking density and thus enhancing scratch resistance.

The content of the photocurable compound is not limited as long as the advantageous effects of the present invention can be achieved, and can be, for example, 1 mass % or more and 97 mass % or less based on the total mass of an inkjet ink. In view of the above, however, the content of the photocurable compound is preferably 30 mass % or more and 95 mass % or less based on the total mass of an inkjet ink.

Examples of the radically polymerizable compounds include unsaturated carboxylic acids and salts thereof, unsaturated carboxylic acid ester compounds, unsaturated carboxylic acid urethane compounds, unsaturated carboxylic acid amide compounds and anhydrides thereof, acrylonitrile, styrene, unsaturated polyesters, unsaturated polyethers, unsaturated polyamides, and unsaturated urethanes. Examples of the unsaturated carboxylic acids include (meth)acrylic acid, itaconic acid, crotonic acid, isocrotonic acid, and maleic acid.

Especially, the radically polymerizable compounds are preferably unsaturated carboxylic acid ester compounds, more preferably (meth)acrylates. As used herein, the term "(meth)acrylate" indicates an acrylate or a methacrylate, the phrase "(meth)acryloyl group" indicates an acryloyl group or a methacryloyl group, and the term "(meth)acrylic" indicates acrylic or methacrylic.

Examples of polyfunctional (meth)acrylates include bifunctional (meth)acrylates, such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethyloltricyclodecane di(meth)acrylate, bisphenol A-PO adduct di(meth)acrylate, neopentyl glycol hydroxypivalate di(meth)acrylate, polytetramethylene glycol di(meth)acrylate, polyethylene glycol diacrylate, and tripropylene glycol diacrylate; and tri- or higher-functionality (meth)acrylates, such as trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, propoxylated glycerol tri(meth)acrylate, and ethoxylated pentaerythritol tetra(meth)acrylate.

Examples of monofunctional (meth)acrylates include isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, diethylene glycol 2-ethylhexyl ether (meth)acrylate, 2-hydroxybutyl (meth)acrylate, 2-(meth)acryloyloxyethyl hexahydrophthalate, butoxyethyl (meth)acrylate, diethylene glycol ethyl ether (meth)acrylate, diethylene glycol methyl ether (meth)acrylate, polyethylene glycol methyl ether (meth)acrylate, propylene glycol methyl ether (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethyl succinate, 2-(meth)acryloyloxyethyl phthalate, 2-(meth)acryloyloxyethyl 2-hydroxyethyl phthalate, and t-butylcyclohexyl (meth)acrylate.

The radically polymerizable compounds preferably include ethylene oxide- or propylene oxide-modified (meth)acrylates (hereinafter also simply referred to as "modified (meth)acrylates.") Such modified (meth)acrylates exhibit higher photosensitivity. Moreover, the modified (meth)acrylates are readily enclosed by a card house structure when an ink undergoes gelation at a low temperature, and are more readily compatible with other ink components even at a high temperature. Further, the modified (meth)acrylates are less likely to cause curling of printed articles during image formation due to their low curing shrinkage.

Examples of commercially available products of polyfunctional modified (meth)acrylates include CD 561, SR 454, SR 499, and SR 494 (from Sartomer Americas), NK Ester A-400, NK Ester A-600, NK Ester 9G, NK Ester 14G, NK Ester DOD-N, NK Ester A-DCP, and NK Ester DCP (from Shin-Nakamura Chemical Co., Ltd.).

Examples of the cationic polymerizable compounds include epoxy compounds, vinyl ether compounds, and oxetane compounds.

The photocurable compounds preferably include at least one oxetane compound, and at least one compound selected from an epoxy compound and a vinyl ether compound from a viewpoint of suppressing shrinkage of recording media during curing of inks.

From a viewpoint of accelerating curing, the epoxy compounds are preferably aromatic epoxides or alicyclic epoxides, more preferably alicyclic epoxides from the above viewpoint.

Examples of the aromatic epoxides include di- or polyglycidyl ethers produced by reacting epichlorohydrin and polyhydric phenols having at least one aromatic nucleus or alkylene oxide adducts thereof. Examples of such aromatic epoxides include di- or polyglycidyl ethers of bisphenol A or alkylene oxide adduct thereof, di- or polyglycidyl ethers of hydrogenated bisphenol A or alkylene oxide adduct thereof, and novolac epoxy resins. Examples of the alkylene oxides include ethylene oxide and propylene oxide.

Examples of the alicyclic epoxides include cyclohexene oxide- or cyclopentene oxide-containing compounds obtained by epoxidizing compounds having at least one cycloalkane ring, such as cyclohexene or cyclopentene ring, using proper oxidizing agents, such as hydrogen peroxide and a peroxy acid.

Examples of the aliphatic epoxides include di- or polyglycidyl ethers of aliphatic polyhydric alcohols or alkylene oxide adducts thereof. Examples of the aliphatic epoxides include alkylene glycol diglycidyl ethers, polyhydric alcohol polyglycidyl ethers, and polyalkylene glycol diglycidyl ethers. Examples of the alkylene glycols include ethylene glycol diglycidyl ether, propylene glycol diglycidyl ether, and 1,6-hexanediol diglycidyl ether. The polyhydric alcohols include glycerol and alkylene oxide adducts thereof. The polyalkylene glycols include polyethylene glycol and alkylene oxide adducts thereof, and polypropylene glycol and alkylene oxide adducts thereof. Examples of the alkylene oxides include ethylene oxide and propylene oxide.

Examples of the vinyl ether compounds include monovinyl ether compounds, divinyl ether compounds, and trivinyl ether compounds. Examples of the monovinyl ether compounds include ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether. Examples of the divinyl ether compounds include ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, and cyclohexanedimethanol divinyl ether. Examples of the trivinyl ether compounds include trimethylolpropane trivinyl ether.

Among these vinyl ether compounds, divinyl ether compounds and trivinyl ether compounds are preferred from a viewpoint of curability, adhesion, and surface hardness, and divinyl ether compounds are more preferred from the above viewpoint.

An oxetane compound is a compound having an oxetane ring. Examples of the oxetane compounds include oxetane ring-containing compounds described in Japanese Patent Application Laid-Open No. 2001-220526 and Japanese Patent Application Laid-Open No. 2001-310937.

Such an oxetane compound preferably has 1 to 4 oxetane rings from a viewpoint of preventing excessive increase in viscosity of inkjet inks, as well as a viewpoint of imparting satisfactory tack to cured articles which are obtained by properly adjusting the glass transition temperature of inkjet inks.

Examples of the compounds having 1 to 4 oxetane rings include a compound represented by general formula 1 described in paragraph 0089 of Japanese Patent Application Laid-Open No. 2005-255821, as well as compounds represented by general formula 2 in paragraph 0092, general formula 7 in paragraph 0107, general formula 8 in paragraph 0109, and general formula 9 in paragraph 0116 of the same reference.

1-3. Gelling Agents

A gelling agent can convert droplets of an ink impacted on a recording medium into the gel state and temporarily fix them (pinning). When an ink is subjected to pinning in the gel state, spreading of the ink and thus coalescence of adjacent dots are suppressed, and consequently higher-definition images can be formed. Moreover, an ink in the gel state suppresses permeation of environmental oxygen into ink droplets and thus suppresses curing inhibition by oxygen. Consequently, high-definition images can be formed at a higher speed. Only one or two or more gelling agents may be contained in an inkjet ink.

The content of the gelling agent is preferably 1.0 mass % or more and 5.0 mass % or less based on the total mass of an ink. By setting the content of the gelling agent to 1.0 mass % or more, spreading of each ink droplet on a recording medium can be suppressed to the same extent, and thereby suppressing the occurrence of gloss variations in the same image. Meanwhile, by setting the content of the gelling agent to less than 5.0 mass %, deposition of the gelling agent on a surface of a formed image can be suppressed, thereby suppressing the occurrence of gloss variations in the same image and enhancing the strength and thus scratch resistance of a cured film. In view of the above, the content of the gelling agent in an inkjet ink is more preferably 2.5 mass % or more and less than 5.0 mass %, further preferably 2.5 mass % or more and less than 4.0 mass %.

Preferably, the gelling agent is substantially free of a photocurable functional group. As used herein, the phrase "substantially free of" means that the amount of the photocurable functional group is 0.1 or lower molar equivalent, relative to 1 mole of the gelling agent. Such a gelling agent, which is substantially free of a photocurable functional group, can presumably suppress inhibition of polymerization and crosslinking of photocurable compounds caused by the photocurable functional group of the gelling agent, and thus satisfactorily enhance the crosslinking density.

In view of the below, the gelling agent preferably crystallizes in an ink at a temperature equal to or lower than the gelation temperature of the ink. As used herein, the term "gelation temperature" refers to a temperature at which the gelling agent undergoes sol-to-gel phase transition accompanied by an abrupt change in the viscosity of the ink during cooling of the ink, which has become a sol or a liquid by heating. Specifically, the gelation temperature can be determined by cooling a sol or a liquid ink while measuring the viscosity with a rheometer (e.g., Physica MCR 300, from Anton Paar GmbH), and identifying a temperature at which the viscosity increases abruptly.

When a gelling agent crystallizes in an ink, sometimes formed is a structure in which photocurable compounds are enclosed in a three-dimensional space formed by the gelling agent crystallized in a sheet form (such a structure is hereinafter referred to as "card house structure"). When such a card house structure is formed, liquid photocurable compounds are held inside the space, thereby further suppressing spreading of ink droplets and further enhancing pinning properties of an ink. Enhanced pinning properties of an ink can suppress coalescence of ink droplets impacted on recording media, and thus form higher-definition images.

In order to form a card house structure, a photocurable compound and a gelling agent, both of which are dissolved in an ink, are preferably compatible with each other. In contrast, when a photocurable compound and a gelling agent, both of which are dissolved in an ink, are in phase-separated, a card house structure is sometimes less likely to be formed.

Examples of the gelling agents suitable for the formation of a crystallization-induced card house structure include a ketone wax, an ester wax, a petroleum wax, a plant-derived wax, an animal-derived wax, a mineral wax, hydrogenated castor oil, a modified wax, a higher fatty acid, a higher alcohol, hydroxystearic acid, fatty acid amides including an N-substituted fatty acid amide and a specialty fatty acid amide, a higher amine, a sucrose fatty acid ester, a synthetic wax, dibenzylidene sorbitol, a dimer acid, and a dimer diol.

Examples of the ketone waxes include dilignoceryl ketone, dibehenyl ketone, distearyl ketone, dieicosyl ketone, dipalmityl ketone, dilauryl ketone, dimyristyl ketone, myristyl palmityl ketone, and palmityl stearyl ketone.

Examples of the ester waxes include behenyl behenate, icosyl icosanoate, stearyl stearate, palmityl stearate, cetyl palmitate, myristyl myristate, cetyl myristate, myricyl cerotate, stearyl stearate, oleyl palmitate, glycerol fatty acid esters, sorbitan fatty acid esters, propylene glycol fatty acid esters, ethylene glycol fatty acid esters, and polyoxyethylene fatty acid esters.

Examples of commercially available products of the ester waxes include EMALEX series (from NIHON EMULSION Co., Ltd., "EMALEX" is a registered trademark of the firm), and RIKEMAL series and POEM series (from RIKEN VITAMIN Co., Ltd., "RIKEMAL" and "POEM" are both registered trademarks of the firm).

Examples of the petroleum waxes include paraffin wax, microcrystalline wax, and petrolatum.

Examples of the plant-derived waxes include Candelilla wax, carnauba wax, rice bran wax, Japan wax, jojoba oil, solid jojoba wax, and jojoba esters.

Examples of the animal-derived waxes include beeswax, lanolin, and spermaceti.

Examples of the mineral waxes include montan wax and hydrogenated wax.

Examples of the modified waxes include montan wax derivatives, paraffin wax derivatives, microcrystalline wax derivatives, 12-hydroxystearic acid derivatives, and polyethylene wax derivatives.

Examples of the higher fatty acids include behenic acid, arachidic acid, stearic acid, palmitic acid, myristic acid, lauric acid, oleic acid, and erucic acid.

Examples of the higher alcohols include stearyl alcohol and behenyl alcohol.

An example of the hydroxystearic acid is 12-hydroxystearic acid.

Examples of the fatty acid amides include lauramide, stearamide, behenamide, oleamide, erucamide, ricinoleamide, and 12-hydroxystearamide.

Examples of commercially available products of the fatty acid amides include NIKKA AMIDE series (from Nippon Kasei Chemical Co., Ltd., "NIKKA AMIDE" is a registered trademark of the firm), ITOHWAX series (from ITOH OIL CHEMICALS CO., LTD.), and FATTY AMIDE series (from Kao Corporation).

Examples of the N-substituted fatty acid amides include N-stearyl stearamide, and N-oleyl palmitamide.

Examples of the specialty fatty acid amides include N,N'-ethylenebis(stearamide), N,N'-ethylenebis(12-hydroxystearamide), and N,N'-xylylenebis(stearamide).

Examples of the higher amines include dodecylamine, tetradecylamine, and octadecylamine.

Examples of the sucrose fatty acid esters include sucrose stearate and sucrose palmitate.

Examples of commercially available products of the sucrose fatty acid esters include RYOTO Sugar Ester series (from Mitsubishi-Chemical Foods Corporation, "RYOTO" is a registered trademark of the firm).

Examples of the synthetic waxes include polyethylene wax and α-olefin-maleic anhydride copolymer wax.

Examples of commercially available products of the synthetic waxes include UNILIN series (from Baker Petrolite, "UNILIN" is a registered trademark of the firm).

An example of the dibenzylidene sorbitol is 1,3:2,4-bis-O-(benzylidene)-D-glucitol.

Examples of commercially available products of dibenzylidene sorbitol include GEL ALL D (from New Japan Chemical Co., Ltd., "GEL ALL" is a registered trademark of the firm).

Examples of commercially available products of the dimer diols include Pripol series (from Croda International Plc, "Pripol" is a registered trademark of the firm).

Among these gelling agents, from a viewpoint of further enhancing pinning properties, a ketone wax, an ester wax, a higher fatty acid, a higher alcohol, and a fatty acid amide are preferred, and a ketone wax represented by general formula G1 and an ester wax represented by general formula G2 are more preferred from the above viewpoint. Only one or two or more of a ketone wax represented by general formula G1 and an ester wax represented by general formula G2 may be contained in an inkjet ink. Further, either a ketone wax represented by general formula G1 or an ester wax represented by general formula G2, or both of them may be contained in an inkjet ink.

General formula G1: R1-CO—R2, where R1 and R2 are each independently a $C_9$-$C_{25}$ linear or branched hydrocarbon group.

General formula G2: R3-COO—R4, where R3 and R4 are each independently a $C_9$-$C_{25}$ linear or branched hydrocarbon group.

Since the linear or branched hydrocarbon group has a carbon number of 9 or more, a ketone wax represented by general formula G1 or an ester wax represented by general formula G2 exhibits higher crystallinity of the gelling agent and generates enough space in the card house structure. Accordingly, photocurable compounds are readily and fully enclosed in the space, thereby further enhancing the pinning properties of an ink. Moreover, since the linear or branched hydrocarbon group has a carbon number of 25 or less, the melting point of the gelling agent is not excessively high, and thus excessive heating of an ink is not necessary during ejection of the ink. In view of the above, each R1 and R2 is particularly preferably a linear hydrocarbon group having a carbon number of 11 or more and less than 23.

From a viewpoint of elevating the gelation temperature of an ink and subjecting the ink to rapid gelation of the ink after the impact, either R1 or R2, or either R3 or R4 is preferably a saturated hydrocarbon group having a carbon number of 11 or more and less than 23. From the above viewpoint, both R1 and R2, or both R3 and R4 are each preferably a saturated hydrocarbon group having a carbon number of 11 or more and less than 23.

Examples of the ketone waxes represented by general formula G1 include dilignoceryl ketone (carbon number: 23-24), dibehenyl ketone (carbon number: 21-22), distearyl ketone (carbon number: 17-18), dieicosyl ketone (carbon number: 19-20), dipalmityl ketone (carbon number: 15-16), dimyristyl ketone (carbon number: 13-14), dilauryl ketone (carbon number: 11-12), lauryl myristyl ketone (carbon number: 11-14), lauryl palmityl ketone (11-16), myristyl palmityl ketone (13-16), myristyl stearyl ketone (13-18), myristyl behenyl ketone (13-22), palmityl stearyl ketone (15-18), palmityl behenyl ketone (15-22), and stearyl behenyl ketone (17-22). The carbon numbers within the parentheses indicate carbon numbers of two hydrocarbon groups interrupted by a carbonyl group.

Examples of commercially available products of the ketone waxes represented by general formula G1 include 18-pentatriacontanone (from Alfa Aeser), hentriacontan-16-one (from Alfa Aeser), and KAOWAX T1 (from Kao Corporation).

Examples of the fatty acid ester waxes represented by general formula G2 include behenyl behenate (carbon number: 21-22), icosyl icosanoate (carbon number: 19-20), stearyl stearate (carbon number: 17-18), palmityl stearate (carbon number: 17-16), lauryl stearate (carbon number: 17-12), cetyl palmitate (carbon number: 15-16), stearyl palmitate (carbon number: 15-18), myristyl myristate (carbon number: 13-14), cetyl myristate (carbon number: 13-16), octyldodecyl myristate (carbon number: 13-20), stearyl oleate (carbon number: 17-18), stearyl erucate (carbon number: 21-18), stearyl linolate (carbon number: 17-18), behenyl oleate (carbon number: 18-22), and arachidyl linolate (carbon number: 17-20). The carbon numbers within the parentheses indicate carbon numbers of two hydrocarbon groups interrupted by an ester group.

Examples of commercially available products of the ester waxes represented by general formula G2 include UNISTER-M-2222SL, spermaceti, Nissan Elector WEP 3, and Nissan Elector WEP 2 (from NOF Corporation; "UNISTER" and "Nissan Elector" are registered trademarks of the firm), EXCEPARL SS and EXCEPARL MY-M (from Kao Corporation; "EXCEPARL" is a registered trademark of the firm), EMALEX CC-18 and EMALEX CC-10 (from Nihon Emulsion Co., Ltd.; "EMALEX" is a registered trademark of the firm), and AMREPS PC (from Kokyu Alcohol Kogyo Co., Ltd., "AMREPS" is a registered trademark of the firm). These commercially available products are often mixtures of two or more substances, and thus may be contained in an ink after separation/purification as needed.

1-4. Other Components

An inkjet ink may further contain other components, such as a colorant, a dispersant, a polymerization initiator auxiliary agent, a polymerization inhibitor, a sensitizer, and a surfactant, as long as the advantageous effects of the present invention can be achieved. Only one or two or more of them may be contained in an inkjet ink.

The colorants include dyes and pigments. The colorants are preferably pigments from a viewpoint of forming images with good weatherability. Pigments can be selected, for example, from yellow pigments, red or magenta pigments, blue or cyan pigments, and black pigments in accordance with colors or the like of images to be formed.

Examples of the yellow pigments include C. I. Pigment Yellow ("C. I. Pigment Yellow" is hereinafter also simply referred to as "PY") 1, PY 3, PY 12, PY 13, PY 14, PY 17, PY 34, PY 35, PY 37, PY 55, PY 74, PY 81, PY 83, PY 93, PY 94, PY 95, PY 97, PY 108, PY 109, PY 110, PY 137, PY 138, PY 139, PY 153, PY 154, PY 155, PY 157, PY 166, PY 167, PY 168, PY 180, PY 185, and PY 193.

Examples of the red or magenta pigments include C. I. Pigment Red ("C. I. Pigment Red" is hereinafter also simply referred to as "PR") 3, PR 5, PR 19, PR 22, PR 31, PR 38, PR 43, PR 48:1, PR 48:2, PR 48:3, PR 48:4, PR 48:5, PR 49:1, PR 53:1, PR 57:1, PR 57:2, PR 58:4, PR 63:1, PR 81, PR 81:1, PR 81:2, PR 81:3, PR 81:4, PR 88, PR 104, PR 108, PR 112, PR 122, PR 123, PR 144, PR 146, PR 149, PR 166, PR 168, PR 169, PR 170, PR 177, PR 178, PR 179, PR 184, PR 185, PR 208, PR 216, PR 226, and PR 257, C. I. Pigment Violet ("C. I. Pigment Violet" is hereinafter also simply referred to as "PV") 3, PV 19, PV 23, PV 29, PV 30, PV 37, PV 50, and PV 88, C. I. Pigment Orange ("C. I. Pigment Orange" is hereinafter also simply referred to as "PO") 13, PO 16, PO 20, and PO 36.

Examples of the blue or cyan pigments include C. I. Pigment Blue ("C. I. Pigment Blue" is hereinafter also simply referred to as "PB") 1, PB 15, PB 15:1, PB 15:2, PB 15:3, PB 15:4, PB 15:6, PB 16, PB 17-1, PB 22, PB 27, PB 28, PB 29, PB 36, and PB 60.

Examples of the black pigments include C. I. Pigment Black ("C. I. Pigment Black" is hereinafter also simply referred to as "PBk") 7, PBk 28, and PBk 26.

The volume-average particle size of the pigments is preferably 0.08 μm or larger and 0.5 μm or smaller from a viewpoint of further enhancing storage stability and discharge stability of inks, and the maximum particle size of the pigments is preferably 0.3 μm or larger and 10 μm or smaller, more preferably 0.3 μm or larger and 3 μm or smaller from the above viewpoint.

The average particle size of pigment particles according to the present invention is determined by dynamic light scattering method using Zetasizer Nano ZSP (from Malvern Instruments Ltd). This measurement apparatus cannot transmit light through a colorant-containing ink due to its high concentration, and thus the measurement is performed after diluting the ink 200 times. The measurement temperature is set to room temperature (25° C.).

The content of the pigment is preferably 0.1 mass % or more and 20.0 mass % or less, more preferably 0.4 mass % or more and 10.0 mass % or less, based on the total mass of an inkjet ink. By setting the content of the pigment to 0.1 mass % or more, satisfactory coloration of formed images can be achieved. Moreover, by setting the content of the pigment to 20.0 mass % or more, discharge stability of inks can be further enhanced.

Examples of the dispersants include hydroxyl-containing carboxylic acid esters, salts of long-chain polyaminoamides and high-molecular-weight acid esters, high-molecular-weight polycarboxylic acid salts, ester salts of long-chain polyaminoamides and polar acids, high-molecular-weight unsaturated acid esters, copolymers, modified polyurethanes, modified polyacrylates, polyether ester-type anionic surfactants, naphthalenesulfonic acid-formalin condensate salts, aromatic sulfonic acid-formalin condensate salts, polyoxyethylene alkyl phosphate esters, polyoxyethylene nonyl phenyl ether, and stearylamine acetate.

Examples of commercially available products of the dispersants include BYK-2164, BYK-168, BYK N-22024, BYKJET-9150, and BYKJET-9151 (from BYK-Chemie GmbH, "BYK" is a registered trademark of the firm), Efka 7701, Efka 4310, Efka 4320, Efka 4401 (from BASF SE), Solsperse 24000GR, Solsperse 39000 (from Lubrizol Corporation, "Solsperse" is a registered trademark of the firm), and AJISPER PB 821, AJISPER PB 824 (Ajinomoto Fine-Techno Co., Inc.; "AJISPER" is a registered trademark of the firm).

The content of the dispersant can be, for example, 20 mass % or more and 70 mass % or less based on the total mass of a pigment. By setting the content of the dispersant to 20 mass % or more based on the total mass of a pigment, the dispersant can cover the surface of the pigment, thereby further suppressing aggregation of the pigment during storage of an ink. Moreover, by setting the content of the dispersant to 70 mass % or less based on the total mass of a pigment, association of the dispersant and a gelling agent is less likely to occur, thereby achieving further satisfactory gelation and pinning of an ink impacted on a recording medium.

Examples of the polymerization initiator auxiliary agents include tertiary amine compounds, such as aromatic tertiary amine compounds.

Examples of the aromatic tertiary amine compounds include N,N-dimethylaniline, N,N-diethylaniline, N,N-dimethyl-p-toluidine, ethyl p-N,N-dimethylaminobenzoate, isoamylethyl p-N,N-dimethylaminobenzoate, N,N-bis(hydroxyethyl)aniline, triehtylamine, and N,N-dimethylhexylamine.

Examples of the polymerization inhibitors include (alkyl) phenol, hydroquinone, catechol, resorcinol, p-methoxyphenol, t-butylcatechol, t-butylhydroquinone, pyrogallol, 1,1-picrylhydrazyl, phenothiazine, p-benzoquinone, nitrosobenzene, 2,5-di-t-butyl-p-benzoquinone, bis(thiobenzoyl) disulfide, picric acid, cupferron, N-nitrosophenylhydroxyl amine aluminum salt, tri-p-nitrophenylmethyl, N-(3-oxyanilino-1,3-dimethylbutylidene)aniline oxide, dibutyl cresol, cyclohexanone oxime cresol, guaiacol, o-isopropylphenol, butylaldehyde oxime, methyl ethyl ketone oxime, and cyclohexanone oxime.

Examples of the sensitizers include polycyclic aromatic compounds substituted with at least one hydroxyl group, or aralkyloxy group or alkoxy group which may be substituted, carbazole derivatives, thioxanthone derivatives, and anthracene derivatives. The sensitizers preferably show UV spectral absorption at a wavelength longer than 300 nm from a viewpoint of accelerating a curing rate.

Examples of the surfactants include anionic surfactants, such as dialkyl sulfosuccinic acid salts, alkylnaphthalenesulfonic acid salts, and fatty acid salts; nonionic surfactants, such as polyoxyethylene alkyl ethers, polyoxyethylene alkyl aryl ethers, acetylene glycols, and polyoxyethylene-polyoxypropylene block copolymer derivatives; cationic surfactants, such as alkylamine salts and quaternary ammonium salts; silicone-based surfactants, and fluorine-based surfactants.

Examples of commercially available products of the silicone-based surfactants include KF-351A, KF-352A, KF-642, X-22-4272 (from Shin-Etsu Chemical Co., Ltd.), BYK 307, BYK 345, BYK 347, BYK 348 (from BYK-Chemie GmbH, "BYK" is a registered trademark of the firm), and TSF 4452 (from GE Toshiba Silicones).

The content of the surfactant is preferably 0.001 mass % or more and less than 1.0 mass % based on the total mass of a primer.

1-5. Physical Properties

The viscosity of an inkjet ink at 80° C. is preferably 3 mPa·s or higher and 20 mPa·s or lower from a viewpoint of further enhancing ejection properties from an inkjet head. The viscosity of an inkjet ink at 25° C. is preferably 1000 mPa·s or higher from a viewpoint of subjecting the ink to satisfactory gelation during the temperature lowering to room temperature after the impact.

The gelation temperature of an inkjet ink is preferably 40° C. or higher and 70° C. or lower. Inks with a gelation temperature of 40° C. or higher rapidly undergo gelation after the impact on recording media, thereby further enhancing pinning properties. Meanwhile, inks with a gelation temperature of 70° C. or lower are less likely to undergo gelation during ejection from an inkjet head where the temperature of the inks is typically about 80° C., thereby achieving further stable ejection of the inks.

The viscosity at 80° C., the viscosity at 25° C., and the gelation temperature of an inkjet ink can be determined using a rheometer by measuring temperature-dependent changes in dynamic viscoelasticity. In the present invention, the viscosity and gelation temperature are values obtained by the following method. An inkjet ink is heated to 100° C. and then cooled to 20° C. at a shear rate of 11.7 (1/s) and a temperature lowering rate of 0.1° C./s while the viscosity was measured with a stress-controlled rheometer Physica MCR 301 (from Anton Paar GmbH, cone plate diameter: 75 mm, cone angle: 1.0°), and thus a temperature-dependent viscosity change curve is obtained. The viscosity at 80° C. and the viscosity at 25° C. are determined by reading the viscosity at 80° C. and 25° C. on the temperature-dependent viscosity change curve. The gelation temperature is determined as a temperature at which the viscosity becomes 200 mPa·s on the temperature-dependent viscosity change curve.

2. Preparation of Inks

The inkjet inks can be obtained, for example, by mixing the above-mentioned initiators, photocurable compounds, gelling agents, and optional components while heating. The obtained mixtures are preferably filtered through predetermined filters. When an inkjet ink contains a pigment and a dispersant, a pigment dispersion may be prepared in advance by dispersing the pigment and the dispersant in a solvent, and then mixed with added remaining components while being heated.

Pigments and dispersants can be dispersed, for example, using a ball mill, a sand mill, an attritor, a roll mill, an agitator, a Henschel mixer, a colloid mill, an ultrasonic homogenizer, a pearl mill, a wet jet mill, or paint shaker.

3. Image Forming Method

The image forming method of the present invention can be performed in substantially the same manner as a known image forming method, in which an inkjet ink is discharged from an inkjet head, impacted on a recording medium, and cured, except for using the above-mentioned inkjet inks.

For example, the image forming method of the present invention includes a first step of ejecting the inkjet ink of an ink set from nozzles of an inkjet head to allow the inkjet ink to impact on a recording medium, and a second step of curing the inkjet ink by irradiating the impacted inkjet ink with actinic radiation.

3-1. First Step

In the first step, droplets of the inkjet ink are discharged from the inkjet head to allow the inkjet ink to impact on a recording medium at positions corresponding to an image to be formed.

Examples of discharge modes from inkjet heads include an on-demand mode and a continuous mode. Examples of inkjet heads corresponding to the on-demand discharge mode include electromechanical conversion-mode inkjet heads, such as single cavity-type, double cavity-type, bender-type, piston-type, shear mode-type, and shared wall-type; and electrothermal conversion-mode inkjet heads, such as thermal inkjet-type and Bubble Jet-type ("Bubble Jet" is a registered trademark of Canon Inc.).

From a viewpoint of further enhancing discharge stability, ink droplets are preferably discharged from an inkjet head while being heated. From the above viewpoint, the temperature of the ink during the discharge is preferably 35° C. or higher and 100° C. or lower, more preferably 35° C. or higher and 80° C. or lower. From a viewpoint of enhancing discharge stability, the ink is preferably ejected at an ink temperature at which the viscosity of the ink becomes preferably 7 mPa·s or higher and 15 mPa·s or lower, more preferably 8 mPa·s or higher and 13 mPa·s or lower.

The inkjet ink is preferably heated such that the temperature, when being fed to fill an inkjet head, becomes (gelation temperature+10)° C. or higher and (gelation temperature+30)° C. or lower, from a viewpoint of enhancing ejection properties of the ink from the inkjet head. By setting the temperature of the ink inside the inkjet heads to (gelation temperature+10)° C. or higher, gelation of the ink inside the inkjet head or on nozzle surfaces can be suppressed, thereby further enhancing discharge stability. Meanwhile, by setting the temperature of the ink inside the inkjet head to (gelation temperature+30)° C. or lower, deterioration of ink components can be further suppressed during image formation.

Heating methods of the ink are not limited. For example, at least any of an ink tank, an ink feed system including a feed pipe and an anterior ink tank closest to a head, a filter-attached pipe, a piezo head, and the like can be heated to a predetermined temperature using any of a panel heater, a ribbon heater, and hot water.

The volume of discharged ink droplets is preferably 2 pL or more and 20 pL or less from a viewpoint of facilitating higher-speed image formation and further enhancing image quality.

3-2. Second Step

In the second step, the inkjet ink impacted in the first step is irradiated with actinic radiation, thereby forming an image of the cured inkjet ink. Actinic radiation is preferably irradiated for 0.001 s or longer and 1.0 s or shorter after the impact of the ink, more preferably for 0.001 s or longer and 0.5 s or shorter for forming a high-definition image.

Examples of actinic radiation include electron beams, ultraviolet rays, $\alpha$ rays, $\gamma$ rays, and X rays. Actinic radiation is preferably ultraviolet rays or electron beams, more preferably ultraviolet rays from a viewpoint of safety, as well as a viewpoint of curing inkjet inks even at lower energy dose. A light source is preferably a light-emitting diode (LED) since curing failure of inks due to melting of the inks with radiant heat from the light source is suppressed by employing a LED as a light source. Examples of such UV-emitting LED light sources include a 395 nm water-cooled LED (from Phoseon Technology).

From a viewpoint of satisfactorily curing inks, a LED light source can be installed such that a peak irradiance of UV rays having a wavelength of 370 nm or longer and 410 nm or shorter becomes 0.5 W/cm$^2$ or higher and 10 W/cm$^2$ or lower, more preferably 1 W/cm$^2$ or higher and 5 W/cm$^2$ or lower on image surfaces. From a viewpoint of suppressing irradiation of inks with radiant heat, the light quantity irradiated on images is preferably less than 350 mJ/cm$^2$.

Actinic radiation may be irradiated in two stages: pre-curing of inks by irradiating with actinic radiation in the period of 0.001 s or longer and 2.0 s or shorter after the impact of the inks as described above, and then full curing of the inks by further irradiating with actinic radiation after the end of the entire printing. Such two-staged irradiation of actinic radiation further suppresses the shrinkage of recording media, which arises during curing of the inks.

From a viewpoint of exerting the advantageous effects of the present invention further preferably, before or simultaneously with the second step, the surface temperature on the side where inkjet inks impact of recording media is preferably controlled to 20° C. or higher and 40° C. or lower.

In the image forming method of the present invention, by setting the total ink film thickness to 2 µm or larger and 20 µm or smaller after curing inks impacted on recording media by irradiating with actinic radiation, the occurrence of curling and crease of the recording media, changes in texture of the recording media, and the like can be prevented efficiently. As used herein, the term "total ink film thickness" refers to the total film thickness value of all the inks applied or printed on recording media. The total ink film thickness can be determined, for example, as an average value of the film thickness measured at a plurality of points where the volume of impacted inks is expected to be large.

3-3. Recording Media

Recording media used in the image forming method of the present invention are not limited as long as images are formed thereon using the above-mentioned ink set, and can be non-absorbent recording media made of plastics (plastic substrates), such as a polyester, polyvinyl chloride, polyethylene, a polyurethane, polypropylene, an acrylic resin, a polycarbonate, polystyrene, acrylonitrile-butadiene-styrene copolymer, polyethylene terephthalate, and polybutylene terephthalate; metal-laminated or metal vapor-deposited paper or plastic films; non-absorbent inorganic recording media, such as metals and glass; and absorbent paper (e.g., printing coated paper). When an ink composition of the present invention is used for package printing, relatively thin recording media are preferably used. In this case, the thickness is preferably 150 μm or smaller, more preferably 120 μm or smaller, further preferably 90 μm or smaller, particularly preferably 50 μm or smaller.

EXAMPLES

Hereinafter, the present invention will be more specifically described with reference to the examples. The examples, however, shall not be construed as limiting the technical scope of the present invention.

Example 1: Inks Containing Radically Polymerizable Compounds and Radical Polymerization Initiators 1. Preparation of Inks Inks were prepared using the following components.

[Monofunctional Photocurable Compounds]
NVC: N-vinylcaprolactam
PEA: Phenoxyethyl acrylate
IBXA: Isobornyl acrylate

[Polyfunctional Photocurable Compounds]
TPGDA: Tripropylene glycol diacrylate
PEG 600DA: Polyethylene glycol #600 diacrylate
4EO-HDDA: 4EO-modified 1,6-hexanediol diacrylate
6EO-TMPTA: 6EO-modified trimethylolpropane triacrylate
3PO-TMPTA: 3PO-modified trimethylolpropane triacrylate
4EO-PETA: 4EO-modified pentaerythritol tetraacrylate
DTMPTA: Ditrimethylolpropane tetraacrylate
DPEPA: Dipentaerythritol polyacrylate As used herein, the phrase "EO-modified" refers to ethylene oxide-modified, and the phrase "PO-modified" refers to propylene oxide-modified.

[Initiators with Molecular Weight of 360 or more]
819: IRGACURE 819
369: IRGACURE 369
379: IRGACURE 379
1001M: ESACURE 1001M
KIP 150: ESCURE KIP 150
TX-1: GENOPOL TX-1

[Initiators with Molecular Weight of less than 360]
TPO: Lucirin TPO
184: IRGACURE 184
907: IRGACURE 907
ITX: Speedcure ITX

[Photopolymerization Inhibitor]
UV 10: Irgastab UV 10 (from BASF SE, "Irgastab" is a registered trademark of the firm)

[Surfactant]
BYK 307: BYK 307

[Gelling Agents]
T1: KAOWAX T1 (distearyl ketone)
WEP 3: Nissan Elector WEP 3 (behenyl behenate)
WE 11: Nissan Elector WE 11 (behenyl stearate)
WEP 2: Nissan Elector WEP 2 (stearyl stearate)
Synthetic gelling agent: synthesized in accordance with the following procedure 1-1. Synthesis of Gelling Agent Into a flask, placed were 200 g of UNILIN 350 (from Baker Hughes Incorporated, "UNILIN" is a registered trademark of Petrolite Corporation), 1.99 g of p-toluenesulfonic acid, 0.25 g of hydroquinone, and 600 mL of toluene as a solvent, and heated to yield a solution. To the solution, 46 mL of acrylic acid was added, and reacted until the generation of water from the reaction system ended to yield a mixture of toluene and the reaction product. The mixture was spontaneously cooled to room temperature, and then a solid component yielded through filtering the mixture was pulverized using methanol, and methanol was removed through filtering and drying in a vacuum oven to yield a synthetic gelling agent having a photocurable functional group.

1-2. Preparation of Pigment Dispersions 1-2-1. Preparation of Magenta Pigment Dispersion 1

Two compounds below were fed into a stainless steel beaker and heated/stirred for 1 hour while being heated on a hot plate at 65° C.

Dispersant: Solsperse 32000 (from Lubrizol Corporation) 9 parts by weight
Photocurable compound: dipropylene glycol diacrylate 71 parts by weight After the mixture was cooled to room temperature, 20 parts by weight of pigment 1 below was added to the mixture, and 200 g of zirconia beads (diameter 0.5 mm) and the resulting mixture were fed into a glass bottle and sealed. The sealed mixture was subjected to dispersion treatment using a paint shaker for 6 hours, and then the zirconia beads were removed to yield magenta pigment dispersion 1 (hereinafter also simply referred to as "dispersion M 1").

Pigment 1: Pigment Violet 19 (Fastogen Super Red BRZ, from DIC Corporation)

1-2-2. Preparation of Black Pigment Dispersion 1

Black pigment dispersion 1 (hereinafter also simply referred to as "dispersion B 1") was obtained in substantially the same manner as above except for changing the pigment to pigment 2 and the time for dispersion treatment to 5 hours.

Pigment 2: Pigment Black 7 (#52, from Mitsubishi Chemical Corporation)

1-3. Preparation of Inks

The following components in the following respective amounts were added to dispersion M 1 and stirred at 80° C. to yield an ink solution. The ink solution was filtered through a Teflon (registered trademark) membrane filter (3 μm, from Advantec Group) to yield magenta ink 1.

| | |
|---|---|
| Pigment dispersion: dispersion M 1 | 22.00 parts by weight |
| Photocurable compound: TPGDA | 12.00 parts by weight |
| Photocurable compound: PEG 600DA | 12.00 parts by weight |
| Photocurable compound: 4EO-HDDA | 10.00 parts by weight |
| Photocurable compound: 6EO-TMPTA | 9.05 parts by weight |
| Photocurable compound: 3PO-TMPTA | 25.00 parts by weight |

-continued

| | |
|---|---|
| Photocurable compound: DPEPA | 5.00 parts by weight |
| Initiator: 819 | 2.00 parts by weight |
| Polymerization inhibitor: UV-10 | 0.10 part by weight |
| Surfactant: BYK 307 | 0.05 part by weight |
| Gelling agent: T1 | 1.80 parts by weight |
| Gelling agent: WEP 3 | 1.00 part by weight |

Black ink 1 was obtained in substantially the same manner as magenta ink 1 except for changing the components and the amounts of dispersion M 1 to those described below.

| | |
|---|---|
| Pigment dispersion: Dispersion B 1 | 10.40 parts by weight |
| Photocurable compound: TPGDA | 12.00 parts by weight |
| Photocurable compound: PEG 600DA | 12.00 parts by weight |
| Photocurable compound: 4EO-HDDA | 10.00 parts by weight |
| Photocurable compound: 6EO-TMPTA | 17.45 parts by weight |
| Photocurable compound: 3PO-TMPTA | 25.00 parts by weight |
| Photocurable compound: DPEPA | 8.00 parts by weight |
| Initiator: 819 | 2.00 parts by weight |
| Polymerization inhibitor: UV-10 | 0.10 part by weight |
| Surfactant: BYK 307 | 0.05 part by weight |
| Gelling agent: T1 | 1.50 parts by weight |
| Gelling agent: WEP 3 | 1.50 parts by weight |

Magenta inks 2 to 30 and black inks 2 to 30 were obtained in substantially the same manner as magenta ink 1 and black ink 1 except for changing the components and the amounts as shown in Tables 2 to 7.

Table 1 shows the structure and molecular weight of each initiator. In Table 1, the column of "Initiator" shows the above-mentioned abbreviations of initiators contained in magenta inks 2 to 30 and black inks 2 to 30, the column of "Structure" shows the structure of each initiator, and the column of "Molecular Weight" shows the molecular weight of each initiator. ESACURE KIP 150 is usually a dimer or a trimer, and the figure in the table indicates the molecular weight of the subunit, and n is the number of the subunit.

In Tables 2 to 7, Ink No. 1 indicates a combination of magenta ink 1 and black ink 1. The same also applies to Inks No. 2 to No. 30. The figure shown in the column of each component is the amount (unit in part(s) by weight) of the component in each magenta ink or black ink.

TABLE 1

| | Initiator | |
|---|---|---|
| Initiator | Structure | Molecular Weight |
| TPO | Bisacylphosphine structure | 348 |
| 819 | Bisacylphosphine structure | 418 |
| 184 | Alkylphenone structure | 204 |
| 907 | Alkylphenone structure | 279 |
| 369 | Alkylphenone structure | 367 |
| 379 | Alkylphenone structure | 380 |
| 1001M | Alkylphenone structure | 515 |
| KIP 150 | Alkylphenone structure | 204 × n (n = 2, 3) |
| ITX | Thioxanthone structure | 254 |
| TX-1 | Thioxanthone structure | 820 |

TABLE 2

Inks No. 1 to 5

| Ink No. | | 1 | | 2 | | 3 | | 4 | | 5 | |
|---|---|---|---|---|---|---|---|---|---|---|---|
| Pigment Dispersion | Dispersion M 1 | 22.0 | | 22.0 | | 22.0 | | 22.0 | | 22.0 | |
| | Dispersion B 1 | | 10.4 | | 10.4 | | 10.4 | | 10.4 | | 10.4 |
| Polyfunctional Photocurable Compound | TPGDA | 12.0 | 12.0 | 12.0 | 12.0 | 12.0 | 12.0 | 12.0 | 12.0 | 12.0 | 12.0 |
| | PEG 600DA | 12.0 | 12.0 | 12.0 | 12.0 | 12.0 | 12.0 | 12.0 | 12.0 | 12.0 | 12.0 |
| | 4EO-HDDA | 10.0 | 10.0 | 10.0 | 10.0 | 10.0 | 10.0 | 10.0 | 10.0 | 10.0 | 10.0 |
| | 6EO-TMPTA | 9.05 | 17.45 | 6.05 | 14.45 | 6.05 | 14.45 | 6.05 | 14.45 | 5.05 | 13.45 |
| | 3PO-TMPTA | 25.0 | 25.0 | 25.0 | 25.0 | 25.0 | 25.0 | 25.0 | 25.0 | 25.0 | 25.0 |
| | DPEPA | 5.0 | 8.0 | 5.0 | 8.0 | 5.0 | 8.0 | 5.0 | 8.0 | 5.0 | 8.0 |
| Initiator with Molecular Weight of 360 or more | 819 | 2.0 | 2.0 | | | | | 5.0 | 5.0 | 5.0 | 5.0 |
| | 369 | | | 5.0 | 5.0 | | | | | | |
| | 379 | | | | | 5.0 | 5.0 | | | | |
| | TX-1 | | | | | | | | | 1.0 | 1.0 |
| Polymerization Inhibitor | UV 10 | 0.1 | 0.1 | 0.1 | 0.1 | 0.1 | 0.1 | 0.1 | 0.1 | 0.1 | 0.1 |
| Surfactant | BYK 307 | 0.05 | 0.05 | 0.05 | 0.05 | 0.05 | 0.05 | 0.05 | 0.05 | 0.05 | 0.05 |
| Gelling Agent | T1 | 1.8 | 1.5 | 1.8 | 1.5 | 1.8 | 1.5 | 1.8 | 1.5 | 1.8 | 1.5 |
| | WEP 3 | 1.0 | 1.5 | 1.0 | 1.5 | 1.0 | 1.5 | 1.0 | 1.5 | 1.0 | 1.5 |

TABLE 3

Inks No. 6 to 10

| Ink No. | | 6 | | 7 | | 8 | | 9 | | 10 | |
|---|---|---|---|---|---|---|---|---|---|---|---|
| Pigment Dispersion | Dispersion M 1 | 22.0 | | 22.0 | | 22.0 | | 22.0 | | 22.0 | |
| | Dispersion B 1 | | 10.4 | | 10.4 | | 10.4 | | 10.4 | | 10.4 |
| Polyfunctional Photocurable Compound | TPGDA | 12.0 | 12.0 | 12.0 | 12.0 | 12.0 | 12.0 | 12.0 | 12.0 | 12.0 | 12.0 |
| | PEG 600DA | 12.0 | 12.0 | 12.0 | 12.0 | 12.0 | 12.0 | 12.0 | 12.0 | 12.0 | 12.0 |
| | 4EO-HDDA | 10.0 | 10.0 | 10.0 | 10.0 | 10.0 | 10.0 | 10.0 | 10.0 | 10.0 | 10.0 |
| | 6EO-TMPTA | 4.05 | 12.45 | 4.05 | 12.45 | 4.05 | 12.45 | 3.05 | 11.45 | 3.55 | 11.95 |
| | 3PO-TMPTA | 25.0 | 25.0 | 25.0 | 25.0 | 25.0 | 25.0 | 25.0 | 25.0 | 25.0 | 25.0 |
| | DPEPA | 5.0 | 8.0 | 5.0 | 8.0 | 5.0 | 8.0 | 5.0 | 8.0 | 5.0 | 8.0 |

TABLE 3-continued

| | Ink No. | 6 | | 7 | | 8 | | 9 | | 10 | |
|---|---|---|---|---|---|---|---|---|---|---|---|
| Initiator with | 819 | 5.0 | 5.0 | 3.0 | 3.0 | 3.0 | 3.0 | 3.0 | 3.0 | 3.0 | 3.0 |
| Molecular | 369 | | | 2.0 | 2.0 | | | | | | |
| Weight of 360 | 379 | | | | | 2.0 | 2.0 | | | | |
| or more | 1001M | | | | | | | 3.0 | 3.0 | 2.5 | 2.5 |
| | TX-1 | 2.0 | 2.0 | 2.0 | 2.0 | 2.0 | 2.0 | 2.0 | 2.0 | 2.0 | 2.0 |
| Polymerization Inhibitor | UV 10 | 0.1 | 0.1 | 0.1 | 0.1 | 0.1 | 0.1 | 0.1 | 0.1 | 0.1 | 0.1 |
| Surfactant | BYK 307 | 0.05 | 0.05 | 0.05 | 0.05 | 0.05 | 0.05 | 0.05 | 0.05 | 0.05 | 0.05 |
| Gelling Agent | T1 | 1.8 | 1.5 | 1.8 | 1.5 | 1.8 | 1.5 | 1.8 | 1.5 | 1.8 | 1.5 |

TABLE 4

Inks No. 11 to 15

| | Ink No. | 11 | | 12 | | 13 | | 14 | | 15 | |
|---|---|---|---|---|---|---|---|---|---|---|---|
| Pigment | Dispersion M 1 | 22.0 | | 22.0 | | 22.0 | | 22.0 | | 22.0 | |
| Dispersion | Dispersion B 1 | | 10.4 | | 10.4 | | 10.4 | | 10.4 | | 10.4 |
| Polyfunctional | TPGDA | 12.0 | 12.0 | 12.0 | 12.0 | 12.0 | 12.0 | 12.0 | 12.0 | 12.0 | 12.0 |
| Photocurable | PEG 600DA | 12.0 | 12.0 | 12.0 | 12.0 | 12.0 | 12.0 | 12.0 | 12.0 | 12.0 | 12.0 |
| Compound | 4EO-HDDA | 10.0 | 10.0 | 10.0 | 10.0 | 10.0 | 10.0 | 10.0 | 10.0 | 10.0 | 10.0 |
| | 6EO-TMPTA | 4.05 | 12.45 | 3.85 | 12.95 | 3.85 | 12.95 | 3.85 | 12.45 | | |
| | 3PO-TMPTA | 25.0 | 25.0 | 25.0 | 25.0 | 25.0 | 25.0 | 25.0 | 25.0 | 18.0 | 18.0 |
| | 4EO-PETA | | | | | 5.0 | 8.0 | | | 11.05 | 19.45 |
| | DPEPA | 5.0 | 8.0 | 5.0 | 8.0 | 5.0 | 5.0 | 5.0 | 8.0 | 5.0 | 8.0 |
| Initiator with | 819 | 3.0 | 3.0 | 5.0 | 5.0 | 5.0 | 5.0 | 5.0 | 5.0 | 5.0 | 5.0 |
| Molecular | KIP 150 | 2.0 | 2.0 | | | | | | | | |
| Weight of 360 | TX-1 | 2.0 | 2.0 | 2.0 | 2.0 | 2.0 | 2.0 | 2.0 | 2.0 | 2.0 | 2.0 |
| or more | | | | | | | | | | | |
| Polymerization Inhibitor | UV 10 | 0.1 | 0.1 | 0.1 | 0.1 | 0.1 | 0.1 | 0.1 | 0.1 | 0.1 | 0.1 |
| Surfactant | BYK 307 | 0.05 | 0.05 | 0.05 | 0.05 | 0.05 | 0.05 | 0.05 | 0.05 | 0.05 | 0.05 |
| Gelling Agent | T1 | 1.8 | 1.5 | 1.8 | 1.8 | 1.8 | 1.8 | | | 1.8 | 1.5 |
| | WEP 3 | 1.0 | 1.5 | | | | | | | 1.0 | 1.5 |
| | WE 11 | | | 1.2 | 1.0 | | | | | | |
| | WEP 2 | | | | | 1.2 | 1.0 | | | | |
| | Synthetic Gelling Agent | | | | | | | 3.0 | 3.0 | | |

TABLE 5

Inks No. 16 to 20

| | Ink No. | 16 | | 17 | | 18 | | 19 | | 20 | |
|---|---|---|---|---|---|---|---|---|---|---|---|
| Pigment | Dispersion M 1 | 22.0 | | 22.0 | | 22.0 | | 22.0 | | 22.0 | |
| Dispersion | Dispersion B 1 | | 10.4 | | 10.4 | | 10.4 | | 10.4 | | 10.4 |
| Polyfunctional | TPGDA | 12.0 | 12.0 | 12.0 | 12.0 | 12.0 | 12.0 | 12.0 | 12.0 | 12.0 | 12.0 |
| Photocurable | PEG 600DA | 12.0 | 12.0 | 12.0 | 12.0 | 12.0 | 12.0 | 12.0 | 12.0 | 12.0 | 12.0 |
| Compound | 4EO-HDDA | 10.0 | 10.0 | 10.0 | 10.0 | 10.0 | 10.0 | 10.0 | 10.0 | 10.0 | 10.0 |
| | 6EO-TMPTA | 8.65 | 16.95 | 4.05 | 12.45 | 4.05 | 12.45 | 4.05 | 12.45 | 4.05 | 12.45 |
| | 3PO-TMPTA | | | 25.0 | 25.0 | 25.0 | 25.0 | 25.0 | 25.0 | 25.0 | 25.0 |
| | DTMPTA | 20.0 | 20.0 | | | | | | | | |
| | DPEPA | 5.0 | 8.0 | 5.0 | 8.0 | 5.0 | 8.0 | 5.0 | 8.0 | 5.0 | 8.0 |
| Initiator with | 819 | 5.0 | 5.0 | 5.0 | 5.0 | 5.0 | 5.0 | 5.0 | 5.0 | 3.0 | 3.0 |
| Molecular | 369 | | | | | | | | | 2.0 | 2.0 |
| Weight of 360 or more | TX-1 | 2.0 | 2.0 | 2.0 | 2.0 | 2.0 | 2.0 | 2.0 | 2.0 | 2.0 | 2.0 |
| Polymerization Inhibitor | UV 10 | 0.1 | 0.1 | 0.1 | 0.1 | 0.1 | 0.1 | 0.1 | 0.1 | 0.1 | 0.1 |
| Surfactant | BYK 307 | 0.05 | 0.05 | 0.05 | 0.05 | 0.05 | 0.05 | 0.05 | 0.05 | 0.05 | 0.05 |
| Gelling Agent | T1 | 2.2 | 2.0 | 1.8 | 1.5 | 1.8 | 1.5 | 1.8 | 1.5 | 1.8 | 1.5 |
| | WEP 3 | 1.0 | 1.5 | 1.0 | 1.5 | 1.0 | 1.5 | 1.0 | 1.5 | 1.0 | 1.5 |

TABLE 6

Inks No. 21 to 25

| Ink No. | | 21 | | 22 | | 23 | | 24 | | 25 | |
|---|---|---|---|---|---|---|---|---|---|---|---|
| Pigment Dispersion | Dispersion M 1 | 22.0 | | 22.0 | | 22.0 | | 22.0 | | 22.0 | |
| | Dispersion B 1 | | 10.4 | | 10.4 | | 10.4 | | 10.4 | | 10.4 |
| Polyfunctional Photocurable Compound | TPGDA | 10.0 | 10.0 | 10.0 | 10.0 | 10.0 | 10.0 | 12.0 | 12.0 | 12.0 | 12.0 |
| | PEG 600DA | 10.0 | 10.0 | 10.0 | 10.0 | 10.0 | 10.0 | 12.0 | 12.0 | 12.0 | 12.0 |
| | 4EO-HDDA | | | | | | | 10.0 | 10.0 | 10.0 | 10.0 |
| | 6EO-TMPTA | 10.05 | 21.45 | 10.05 | 21.45 | 10.05 | 21.45 | 6.05 | 14.45 | 6.05 | 14.45 |
| | 3PO-TMPTA | 10.0 | 10.0 | 10.0 | 10.0 | 10.0 | 10.0 | 25.0 | 25.0 | 25.0 | 25.0 |
| | DPEPA | 10.0 | 10.0 | 10.0 | 10.0 | 10.0 | 10.0 | 5.0 | 8.0 | 5.0 | 8.0 |
| Monofuctional Photocurable Compound | NVC | 20.0 | 20.0 | | | | | | | | |
| | PEA | | | 20.0 | 20.0 | | | | | | |
| | IBXA | | | | | 20.0 | 20.0 | | | | |
| Initiator with Molecular Weight of 360 or more | 819 | 5.0 | 5.0 | 5.0 | 5.0 | 5.0 | 5.0 | | | | |
| | TPO | | | | | | | 5.0 | 5.0 | | |
| Initiator with Molecular Weight of less than 360 | 184 | | | | | | | | | 5.0 | 5.0 |
| Polymerization Inhibitor | UV 10 | 0.1 | 0.1 | 0.1 | 0.1 | 0.1 | 0.1 | 0.1 | 0.1 | 0.1 | 0.1 |
| Surfactant | BYK 307 | 0.05 | 0.05 | 0.05 | 0.05 | 0.05 | 0.05 | 0.05 | 0.05 | 0.05 | 0.05 |
| Gelling Agent | T1 | 1.8 | 1.5 | 1.8 | 1.5 | 1.8 | 1.5 | 1.8 | 1.5 | 1.8 | 1.5 |
| | WEP 3 | 1.0 | 1.5 | 1.0 | 1.5 | 1.0 | 1.5 | 1.0 | 1.5 | 1.0 | 1.5 |

TABLE 7

Inks No. 26 to 30

| Ink No. | | 26 | | 27 | | 28 | | 29 | | 30 | |
|---|---|---|---|---|---|---|---|---|---|---|---|
| Pigment Dispersion | Dispersion M 1 | 22.0 | | 22.0 | | 22.0 | | 22.0 | | 22.0 | |
| | Dispersion B 1 | | 10.4 | | 10.4 | | 10.4 | | 10.4 | | 10.4 |
| Polyfunctional Photocurable Compound | TPGDA | 12.0 | 12.0 | 12.0 | 12.0 | 12.0 | 12.0 | 12.0 | 12.0 | 12.0 | 12.0 |
| | PEG 600DA | 12.0 | 12.0 | 12.0 | 12.0 | 12.0 | 12.0 | 12.0 | 12.0 | 12.0 | 12.0 |
| | 4EO-HDDA | 10.0 | 10.0 | 10.0 | 10.0 | 10.0 | 10.0 | 10.0 | 10.0 | 10.0 | 10.0 |
| | 6EO-TMPTA | 6.05 | 14.45 | 5.05 | 13.45 | 8.85 | 17.45 | 2.25 | 10.95 | 3.85 | 7.45 |
| | 3PO-TMPTA | 25.0 | 25.0 | 25.0 | 25.0 | 25.0 | 25.0 | 25.0 | 25.0 | 20.0 | 25.0 |
| | DPEPA | 5.0 | 8.0 | 5.0 | 8.0 | 5.0 | 8.0 | 5.0 | 8.0 | 5.0 | 8.0 |
| Initiator with Molecular Weight of 360 or more | 819 | | | 5.0 | 5.0 | 5.0 | 5.0 | 5.0 | 5.0 | 5.0 | 5.0 |
| | TX-1 | | | | | | | 1.0 | 1.0 | | |
| Initiator with Molecular Weight of less than 360 | 907 | 5.0 | 5.0 | | | | | | | | |
| | ITX | | | 1.0 | 1.0 | | | | | | |
| Polymerization Inhibitor | UV 10 | 0.1 | 0.1 | 0.1 | 0.1 | 0.1 | 0.1 | 0.1 | 0.1 | 0.1 | 0.1 |
| Surfactant | BYK 307 | 0.05 | 0.05 | 0.05 | 0.05 | 0.05 | 0.05 | 0.05 | 0.05 | 0.05 | 0.05 |
| Gelling Agent | T1 | 1.8 | 1.5 | 1.8 | 1.5 | | | 3.0 | 3.0 | | |
| | WEP 3 | 1.0 | 1.5 | 1.0 | 1.5 | | | 1.5 | 1.5 | | |
| | WE 11 | | | | | | | 1.0 | 1.0 | | |
| | Synthetic Gelling Agent | | | | | | | | | 10.0 | 10.0 |

2. Image Formation and Evaluation 2-1. Gloss Uniformity

Black ink 1 was fed to fill an ink tank of an inkjet recording apparatus equipped with KM1800i (number of nozzles: 1776, from Konica Minolta, Inc.). The magenta ink was discharged at 23° C. and 55% RH, in a section (2 cm×2 cm) set on printing art paper (Tokuhishi Art, basis weight 104.7 g/m$^2$, from Mitsubishi Paper Mills Limited) so that the amount of adhered ink became 9 g/m$^2$, and then irradiated with a UV ray having a wavelength of 395 nm using a LED (from KYOCERA Corporation) to form a solid image. Irradiation conditions of the UV ray are an irradiation width of 68 mm, an irradiation distance of 70 mm, and an irradiance on recording media of 2.50 W/cm$^2$. The temperature of the substrate surface was adjusted to 30° C. during the discharge, and the printing speed was adjusted to 60 m/min.

Images were also formed using black inks 2 to 30 in substantially the same manner as above. During the image formation, the temperature of the substrate surface during the discharge, and the printing speed for each ink were changed to the conditions as shown in Tables 8 to 10. The light source was selected for each ink as shown in Tables 8 to 10, from either irradiation with a LED under the above-mentioned conditions or irradiation with a metal halide lamp (SubZero 085, from Integration Technology Ltd.) at an irradiation distance of 10 mm and an irradiance on recording media of 0.98 W/cm$^2$.

With a digital handy gloss meter (Gloss Checker 1G-331, from HORIBA, Ltd.), 60° reflection gloss values were measured at 10 points in a solid image. Absolute difference values between the maximum and the minimum gloss values among the ten points (Gd=Gmax−Gmin) were calculated.

Images were evaluated in accordance with the following criteria, based on the absolute values and visual observation results.
Excellent: absolute difference values of less than 5 for all the images
Good: absolute difference values of 5 or more and less than 10 for all the images
Moderate: absolute difference values of 10 or more for all the images
Poor: absolute difference values of 10 or more for all the images and noticeable rough texture for some images 2-2. Surface Curability Solid images (amount of adhered ink 10 g/m$^2$) were formed on printing art paper (Tokuhishi Art, basis weight 104.7 g/m$^2$, from Mitsubishi Paper Mills Limited) in substantially the same manner as that described in 2-1, except for filling an ink tank of the inkjet recording apparatus with magenta ink 1.

The solid images were evaluated for surface tack by touching with fingers. Also, in accordance with the method described in "JIS K 5701-1 6.2.3 friction resistance test," solid images were rubbed, under a load of 800 g, with a 2 cm$^2$-size piece which was cut from printing art paper (Tokuhishi Art, basis weight 104.7 g/m$^2$, from Mitsubishi Paper Mills Limited) and placed on the solid images. Subsequently, the degree of color migration to the printing art paper cut as a 2 cm$^2$-size piece was visually observed.
Excellent: neither surface tack nor color migration
Good: no surface tack, but slight color migration
Moderate: slight surface tack and slight color migration
Poor: both surface tack and color migration 2-3. Scratch Resistance Through the same procedure as that described in 2-1, solid images (amount of adhered ink 9 g/m$^2$) were formed on printing art paper (Tokuhishi Art, basis weight 104.7 g/m$^2$, from Mitsubishi Paper Mills Limited). The images were evaluated in accordance with the following criteria, based on the presence or absence of scratches on the image surfaces and the size of blank space generated after rubbing with nails from the top to the bottom sides of the formed images 3 times.
Excellent: neither scratch nor blank space
Good: slight scratch on image surface, but no blank space at all
Moderate: blank space with length of less than 0.5 cm on image
Poor: blank space with length of 0.5 cm or more on image 2-4. Evaluation Results Evaluation results are shown in Tables 8 to 10. In Tables 8 to 10, the description in the column "Substrate Temperature" indicates the surface temperature of a recording medium during discharge of an ink, the description in the column "Printing Speed" indicates the moving speed of a recording medium during discharge of an ink, and the description in the column of "Light Source" indicates either the above-mentioned LED or a metal halide lamp ("metal halide lamp" is expressed simply as "Metal Halide" in Tables 8 to 10) used.

TABLE 8

Evaluation of Inks No. 1 to 11

| | Recording Conditions | | | Evaluation Results | | |
|---|---|---|---|---|---|---|
| | Substrate | | | | | |
| Ink No. | Temperature (° C.) | Printing Speed (m/min) | Light Source | Gloss Uniformity | Surface Curability | Scratch Resistance |
| 1 | 30 | 60 | LED | Good | Good | Good |
| 2 | 30 | 60 | LED | Good | Good | Good |
| 3 | 30 | 60 | LED | Good | Good | Good |
| 4 | 30 | 60 | LED | Excellent | Good | Excellent |
| 5 | 30 | 60 | LED | Excellent | Good | Excellent |
| 6 | 30 | 60 | LED | Excellent | Excellent | Excellent |
| 7 | 30 | 60 | LED | Excellent | Excellent | Good |
| 8 | 30 | 60 | LED | Excellent | Excellent | Good |
| 9 | 30 | 60 | LED | Good | Excellent | Good |
| 10 | 30 | 40 | Metal Halide | Good | Excellent | Good |
| 11 | 30 | 40 | Metal Halide | Good | Excellent | Excellent |

TABLE 9

Evaluation of Inks No. 12 to 20

| | Recording Conditions | | | Evaluation Results | | |
|---|---|---|---|---|---|---|
| | Substrate | | | | | |
| Ink No. | Temperature (° C.) | Printing Speed (m/min) | Light Source | Gloss Uniformity | Surface Curability | Scratch Resistance |
| 12 | 30 | 60 | LED | Excellent | Excellent | Excellent |
| 13 | 30 | 60 | LED | Excellent | Excellent | Excellent |
| 14 | 30 | 60 | LED | Excellent | Excellent | Good |
| 15 | 30 | 60 | LED | Excellent | Excellent | Excellent |
| 16 | 30 | 60 | LED | Excellent | Excellent | Excellent |
| 17 | 20 | 60 | LED | Good | Excellent | Excellent |
| 18 | 40 | 60 | LED | Excellent | Good | Excellent |

TABLE 9-continued

Evaluation of Inks No. 12 to 20

| | Recording Conditions | | | Evaluation Results | | |
|---|---|---|---|---|---|---|
| | Substrate | | | | | |
| Ink No. | Temperature (° C.) | Printing Speed (m/min) | Light Source | Gloss Uniformity | Surface Curability | Scratch Resistance |
| 19 | 30 | 80 | LED | Excellent | Excellent | Good |
| 20 | 30 | 80 | LED | Good | Excellent | Moderate |

TABLE 10

Evaluation of Inks No. 21 to 30

| | Recording Conditions | | | Evaluation Results | | |
|---|---|---|---|---|---|---|
| | Substrate | | | | | |
| Ink No. | Temperature (° C.) | Printing Speed (m/min) | Light Source | Gloss Uniformity | Surface Curability | Scratch Resistance |
| 21 | 30 | 60 | LED | Poor | Poor | Poor |
| 22 | 30 | 60 | LED | Poor | Poor | Poor |
| 23 | 30 | 60 | LED | Poor | Poor | Poor |
| 24 | 30 | 60 | LED | Moderate | Moderate | Excellent |
| 25 | 30 | 40 | Metal Halide | Poor | Moderate | Excellent |
| 26 | 30 | 40 | Metal Halide | Poor | Moderate | Excellent |
| 27 | 30 | 60 | LED | Moderate | Moderate | Excellent |
| 28 | 30 | 60 | LED | Poor | Poor | Good |
| 29 | 30 | 60 | LED | Poor | Poor | Good |
| 30 | 30 | 60 | LED | Poor | Poor | Moderate |

Images formed from inks No. 1 to 20 exhibited uniform gloss in the same image, low surface tack, and resistance to scratching.

In contrast, images formed from inks No. 21 to 23, each of which has the content of a monofunctional photocurable compound of 5.0 mass % or more, exhibited low ratings in all the above-mentioned items. This is presumably because decomposed initiators, gelling agents, and uncured photocurable compounds are deposited on image surfaces due to the low crosslinking density of the cured inks, resulting in low gloss uniformity and surface curability, as well as low scratch resistance due to the low crosslinking density.

Images formed from Inks No. 24 to 27, each of which has the content of an initiator with molecular weight of less than 360 of 0.1 mass % or more, exhibited low gloss uniformity and surface curability. This is presumably due to the deposition of the small-molecular-weight initiator on image surfaces.

Images formed from Ink No. 28, which does not contain a gelling agent, exhibited low ratings in all the above-mentioned items. This is presumably because the gelling agent-free ink results in no gloss on image surfaces, as well as because curing inhibition by oxygen takes place, thereby lowering surface curability and scratch resistance.

Images formed from Inks No. 29 and 30, each of which has the content of a gelling agent of 5.0 mass % or more, exhibited low gloss uniformity, surface curability, and scratch resistance. This is presumably because the partial deposition of the gelling agent on image surfaces lowers gloss uniformity and surface curability, as well as because the gelling agent weakens films, thereby lowering scratch resistance.

Images formed from Inks No. 4 to 20 containing an initiator having a bisacylphosphine structure exhibited the tendency to high gloss uniformity and surface curability. This is presumably because the initiator having a bisacylphosphine structure is highly reactive and thus easily incorporated into polymers formed by polymerizing photocurable compounds. Inks No. 5 to 20 containing both an initiator having a bisacylphosphine structure and an initiator having a thioxanthone structure exhibited the above tendency more noticeably.

Images formed from Inks No. 12 and 13 containing a gelling agent that is substantially free of a photocurable functional group exhibited higher scratch resistance than images formed from Ink No. 14 containing a gelling agent that contains a photocurable functional group. This is presumably because polymerization initiation points do not exist excessively and thus photocurable compounds are fully polymerized.

Example 2: Inks Containing Cationic Polymerizable Compounds and Cationic Polymerization Initiators 1. Preparation of Inks
Inks were prepared using the following components.
[Polyfunctional Photocurable Compounds]
Oxetane 1: 3,3'-(oxybismethylene)bis(3-ethyloxetane)
Epoxy 1: 3',4'-epoxycyclohexylmethyl 3,4-epoxycyclohexanecarboxylate
[Initiators with Molecular Weight of 360 or more]
CPI-100P: CPI-100P (from San-Apro Ltd.)
250: IRGACURE 250 (from BASF SE)
[Initiator with Molecular Weight of less than 360]
TPSB: triphenylsulfonium bromide

[Surfactant]

X 22-4272: X-22-4272 (from Shin-Etsu Chemical Co., Ltd.)

[Gelling Agent]

Paraffin: paraffin wax (from Wako Pure Chemical Industries, Ltd., mp: 68 to 70° C.)

1-1. Preparation of Pigment Dispersions 1-1-1. Magenta Pigment Dispersion 2

The following two compounds were fed into a stainless steel beaker. The mixture was heated/stirred for 1 hour while being heated on a hot plate at 65° C.

| | |
|---|---|
| Dispersant: AJISPER PB 824 (from Ajinomoto Fine-Techno Co., Inc.) | 9 parts by weight |
| Photocurable compound: Oxetane 1 | 70 parts by weight |

After the mixture was cooled to room temperature, 21 parts by weight of pigment 1 below was added to the mixture, and 200 g of zirconia beads (diameter 0.5 mm) and the resulting mixture were fed into a glass bottle and sealed. The sealed mixture was subjected to dispersion treatment using a paint shaker for 8 hours, and then the zirconia beads were removed to yield magenta pigment dispersion 2 (hereinafter also simply referred to as "dispersion M 2").

Pigment 1: Pigment Red 122 (Chromofine Red 6112JC, from Dainichiseika Color & Chemicals Mfg. Co., Ltd.)

1-1-2. Black Pigment Dispersion 2

The following two compounds were fed into a stainless steel beaker. The mixture was heated/stirred for 1 hour while being heated on a hot plate at 65° C.

| | |
|---|---|
| Dispersant: AJISPER PB 824 (from Ajinomoto Fine-Techno Co., Inc.) | 9 parts by weight |
| Photocurable compound: Oxetane 1 | 70 parts by weight |

After the mixture was cooled to room temperature, 21 parts by weight of the pigment below was added to the mixture, and 200 g of zirconia beads (diameter 0.5 mm) and the resulting mixture were fed into a glass bottle and sealed. The sealed mixture was subjected to dispersion treatment using a paint shaker for 8 hours, and then the zirconia beads were removed to yield black pigment dispersion 2 (hereinafter also simply referred to as "dispersion B 2").

Pigment 1: Pigment Black 7 (#52, from Mitsubishi Chemical Corporation)

1-2. Preparation of Inks 1-2-1. Preparation of Magenta Ink 31

The following components in the following respective amounts were added to dispersion M 2 and stirred at 80° C. to yield an ink solution. The ink solution was filtered through a metal mesh filter (#3000) to yield magenta ink 31.

| | |
|---|---|
| Pigment dispersion: Dispersion M 2 | 19.00 parts by weight |
| Photocurable compound: Oxetane 1 | 64.95 parts by weight |
| Photocurable compound: Epoxy 1 | 10.00 parts by weight |
| Initiator: CPI-100P | 4.00 parts by weight |
| Surfactant: X22-4272 | 0.05 part by weight |
| Gelling agent: Paraffin | 2.00 parts by weight |

1-2-2. Preparation of Black Ink 31

The following components in the following respective amounts were added to dispersion B 2 and stirred at 80° C. to yield an ink solution. The ink solution was filtered through a metal mesh filter (#3000) to yield black ink 1.

| | |
|---|---|
| Pigment dispersion: Dispersion B 2 | 10.00 parts by weight |
| Photocurable compound: Oxetane 1 | 73.95 parts by weight |
| Photocurable compound: Epoxy 1 | 10.00 parts by weight |
| Initiator: CPI-100P | 4.00 parts by weight |
| Surfactant: X 22-4272 | 0.05 part by weight |
| Gelling agent: Paraffin | 2.00 parts by weight |

Magenta inks 32 and 33, and black inks 32 and 33 were obtained in substantially the same manner as magenta ink 31 and black ink 31, except for changing the above components and amounts as shown in Table 11.

TABLE 11

Inks No. 31 to 33

| | Ink No. | 31 | | 32 | | 33 | |
|---|---|---|---|---|---|---|---|
| Pigment Dispersion | Dispersion M 2 | 19.0 | | 19.0 | | 19.0 | |
| | Dispersion B 2 | | 10.0 | | 10.0 | | 10.0 |
| Polyfunctional Photocurable Compound | Oxetane 1 | 64.95 | 75.95 | 64.95 | 75.95 | 64.95 | 75.95 |
| | Epoxy 1 | 10.0 | 10.0 | 10.0 | 10.0 | 10.0 | 10.0 |
| Initiator with Molecular Weight of 360 or more | CPI-100P | 4.0 | 4.0 | | | | |
| | 250 | | | 4.0 | 4.0 | | |
| Initiator with Molecular Weight of less than 360 | TPSB | | | | | 4.0 | 4.0 |
| Surfactant | X22-4272 | 0.05 | 0.05 | 0.05 | 0.05 | 0.05 | 0.05 |
| Gelling Agent | Paraffin | 2.0 | 2.0 | 2.0 | 2.0 | 2.0 | 2.0 |

2. Image Formation and Evaluation

Images were formed and evaluated in substantially the same manner as Example 1. Evaluation results are shown in Table 12.

TABLE 12

Evaluation of Inks No. 31 to 33

| | Recording Conditions | | | Evaluation Results | | |
|---|---|---|---|---|---|---|
| Cationic Magenta Ink No. | Substrate Temperature (° C.) | Printing Speed (m/min) | Light Source | Gloss Uniformity | Surface Curability | Scratch Resistance |
| 31 | 30 | 60 | Metal Halide | Good | Excellent | Good |
| 32 | 30 | 60 | Metal Halide | Good | Excellent | Good |
| 33 | 30 | 60 | Metal Halide | Poor | Excellent | Good |

Images formed from Inks No. 31 and 32 exhibited uniform gloss in the same image, low surface tack, and resistance to scratching.

In contrast, images formed from Ink No. 33, which has the content of an initiator with molecular weight of less than 360 is 0.1 mass % or more, exhibited low gloss uniformity. This is presumably due to the deposition of the small-molecular-weight initiator on image surfaces.

INDUSTRIAL APPLICABILITY

The inkjet ink of the present invention can form images with low unevenness in gloss in the same image, and high durability. Accordingly, the present invention is believed to be employed in image formation for food packages, for example, and thus contribute to further widespread use of inkjet recording methods in the corresponding fields.

This application is entitled to and claims the benefit of Japanese Patent Application No. 2015-023043, filed on Feb. 9, 2015, the disclosure of which including the specification, drawings and abstract is incorporated herein by reference in its entirety.

The invention claimed is:

1. An actinic radiation-curable inkjet ink which reversibly undergoes sol-gel phase transition through a temperature change, the inkjet ink comprising: one or more polymerization initiators, one or more photocurable compounds, and a gelling agent, wherein:
    the polymerization initiators include one or more polymerization initiators with a molecular weight of 360 or more;
    the photocurable compounds include a polyfunctional photocurable compound;
    a content of the at least one polymerization initiator with a molecular weight of 360 or more is 3.0 mass % or more and less than 8.0 mass %;
    a content of the gelling agent is 1.0 mass % or more and less than 5.0 mass %;
    a content of a polymerization initiator with a molecular weight of less than 360 is less than 0.1 mass %; and
    a content of a monofunctional photocurable compound is less than 5.0 mass %.

2. The inkjet ink according to claim 1, wherein the polymerization initiators with a molecular weight of 360 or more include a radical polymerization initiator having a bisacylphosphine structure.

3. The inkjet ink according to claim 2, wherein the polymerization initiators with a molecular weight of 360 or more further include a polymerization initiator having a thioxanthone structure.

4. The inkjet ink according to claim 1, wherein the gelling agent is substantially free of a photocurable functional group.

5. The inkjet ink according to claim 1, wherein the gelling agent includes a compound represented by general formula G1:

R1-CO—R2            General formula G1 wherein R1 and R2 are each independently a $C_9$-$C_{25}$ linear or branched hydrocarbon group, or a compound represented by general formula G2:

R3-COO—R4            General formula G2 wherein R3 and R4 are each independently a $C_9$-$C_{25}$ linear or branched hydrocarbon group.

6. An image forming method comprising ejecting the inkjet ink according to claim 1 from a nozzle of an inkjet head to allow the inkjet ink to impact on a recording medium, and curing the inkjet ink by irradiating the impacted inkjet ink with actinic radiation.

7. The image forming method according to claim 6, further comprising, before or simultaneously with the allowing of the inkjet ink to impact, controlling a surface temperature at 20° C. or higher and 40° C. or lower of the recording medium on a side where the inkjet ink impacts.

* * * * *